United States Patent [19]
Wegner

[11] Patent Number: 5,651,241
[45] Date of Patent: Jul. 29, 1997

[54] WALK-BEHIND MOWER CONTROLS WITH DUAL FUNCTION CONTROL BRACKET

[75] Inventor: Mark J. Wegner, Watertown, Wis.

[73] Assignee: Ransomes America Corporation, Lincoln, Nebr.

[21] Appl. No.: 540,660

[22] Filed: Oct. 11, 1995

[51] Int. Cl.⁶ .................................................. A01D 69/06
[52] U.S. Cl. ............................. 56/11.2; 56/10.9; 56/11.4
[58] Field of Search ..................................... 56/11.2, 11.5, 56/11.8, 11.4, 10.9, 11.1, 11.9, 11.3, DIG. 6; 180/6.48, 19.3, 19.1

[56] References Cited

U.S. PATENT DOCUMENTS

| | | |
|---|---|---|
| Re. 33,131 | 12/1989 | Morrison . |
| 2,841,959 | 7/1958 | Snow . |
| 3,024,858 | 3/1962 | Davis et al. . |
| 3,323,607 | 6/1967 | Futamata . |
| 3,443,656 | 5/1969 | Stolz . |
| 3,541,878 | 11/1970 | Haffner . |
| 3,550,708 | 12/1970 | Paramythioti . |
| 3,616,869 | 11/1971 | Rilling . |
| 3,688,858 | 9/1972 | Jespersen . |
| 3,816,985 | 6/1974 | Sorenson et al. . |
| 3,854,271 | 12/1974 | Aldred . |
| 3,876,021 | 4/1975 | Baumgartner . |
| 3,888,083 | 6/1975 | Tone . |
| 3,938,401 | 2/1976 | Bauer . |
| 4,202,422 | 5/1980 | McLean . |
| 4,470,243 | 9/1984 | Rayfield ................................. 56/11.2 |
| 4,476,643 | 10/1984 | Hilchey et al. ...................... 56/11.8 X |
| 4,573,307 | 3/1986 | Wick ..................................... 56/11.8 |
| 4,743,220 | 5/1988 | Berrios . |
| 4,754,815 | 7/1988 | Brouwer et al. . |
| 4,787,195 | 11/1988 | Wenzel . |
| 4,879,867 | 11/1989 | Wenzel . |
| 4,920,733 | 5/1990 | Berrios . |
| 4,920,734 | 5/1990 | Wenzel . |
| 4,967,543 | 11/1990 | Scag et al. . |
| 4,991,382 | 2/1991 | Scag . |
| 5,020,308 | 6/1991 | Braun et al. ....................... 56/11.5 X |
| 5,077,959 | 1/1992 | Wenzel . |
| 5,127,215 | 7/1992 | Wenzel . |
| 5,138,824 | 8/1992 | Oshima et al. ..................... 56/11.5 X |

(List continued on next page.)

FOREIGN PATENT DOCUMENTS

| | | |
|---|---|---|
| 290097 | 1/1969 | Australia . |
| 1-56974/80 | 10/1980 | Australia . |
| 1243550 | 10/1988 | Canada . |
| 1267042 | 3/1990 | Canada . |
| 1267324 | 4/1990 | Canada . |
| 0185513 | 6/1986 | European Pat. Off. . |
| 2154289 | 9/1985 | United Kingdom . |

OTHER PUBLICATIONS

Ransomes Hydro Mid–Size Parts Manual, P/N 38422C, Dated Feb. 1994.

Ransomes Hydro Mid–Size Power Units; P/N 2308093 REVA, Dated Mar. 1995.

*Primary Examiner*—Terry Lee Melius
*Assistant Examiner*—Victor Batson
*Attorney, Agent, or Firm*—Harness, Dickey & Pierce, P.L.C.

[57] ABSTRACT

A mechanical system for a controlling a reversible pump in a walk-behind turf care machine having a hydrostatic drive and operator speed and traction controls. The pump includes a rotatable trunion shaft connected to the traction control for controlling hydrostatic pump displacement and direction. A rotatable lever structure fits over the trunion shaft and includes a rotary sleeve, an arm and roller. A control bracket, including a V-shaped contact portion having opposed surfaces for engaging the roller, is operatively connected to the speed and traction controls and to the turf machine frame about a pivot point. Operator manipulation of the control bracket via the speed and traction controls causes a rotatable engagement between the control bracket and the roller, which in turn sets the maximum forward/reverse speeds and direction of the hydrostatic drive. When the traction control is neutral, a spring arrangement is provided for urging of the hydrostatic pump into its neutral position. An improved operator station is also provided.

19 Claims, 5 Drawing Sheets

U.S. PATENT DOCUMENTS

| | | | |
|---|---|---|---|
| 5,261,141 | 11/1993 | La Boda | 56/11.8 X |
| 5,279,101 | 1/1994 | Sueshige | 56/11.5 |
| 5,297,379 | 3/1994 | Smith | 56/11.8 |
| 5,343,678 | 9/1994 | Stuart . | |
| 5,355,662 | 10/1994 | Schmidt | 56/11.8 X |
| 5,375,674 | 12/1994 | Peter | 56/11.2 X |
| 5,488,818 | 2/1996 | Powers et al. | 56/11.8 X |
| 5,542,241 | 8/1996 | Lydy et al. | 56/11.8 X |

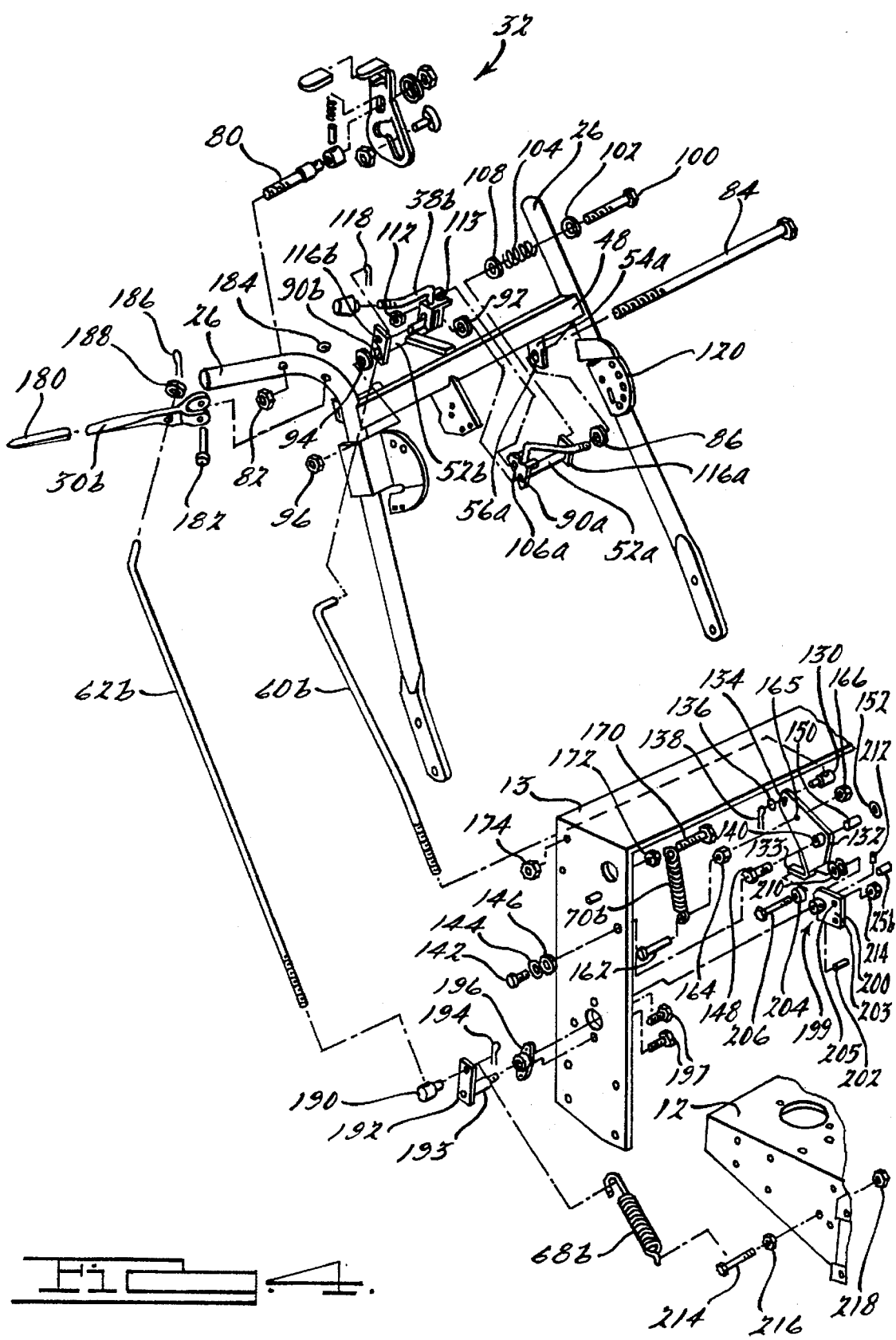

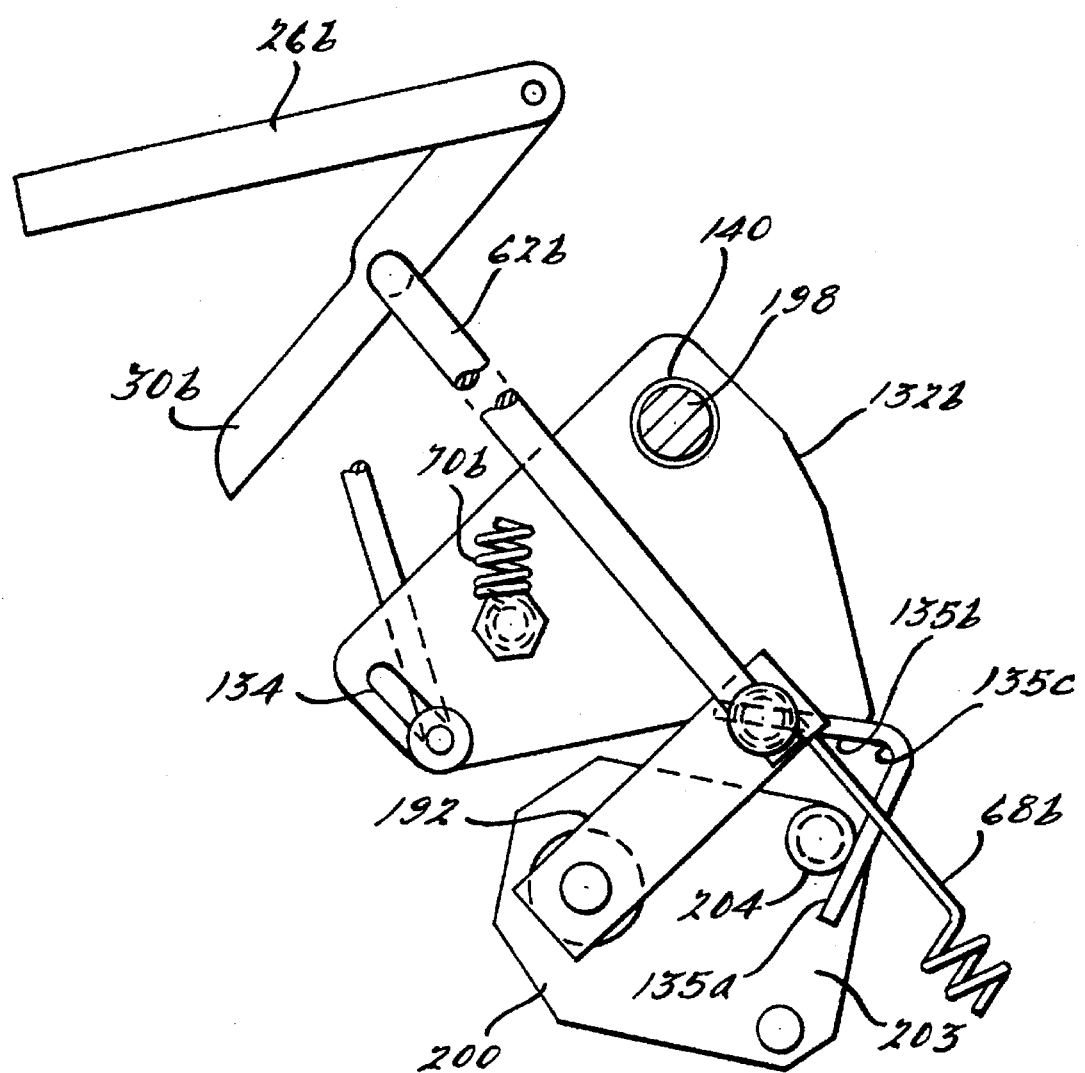

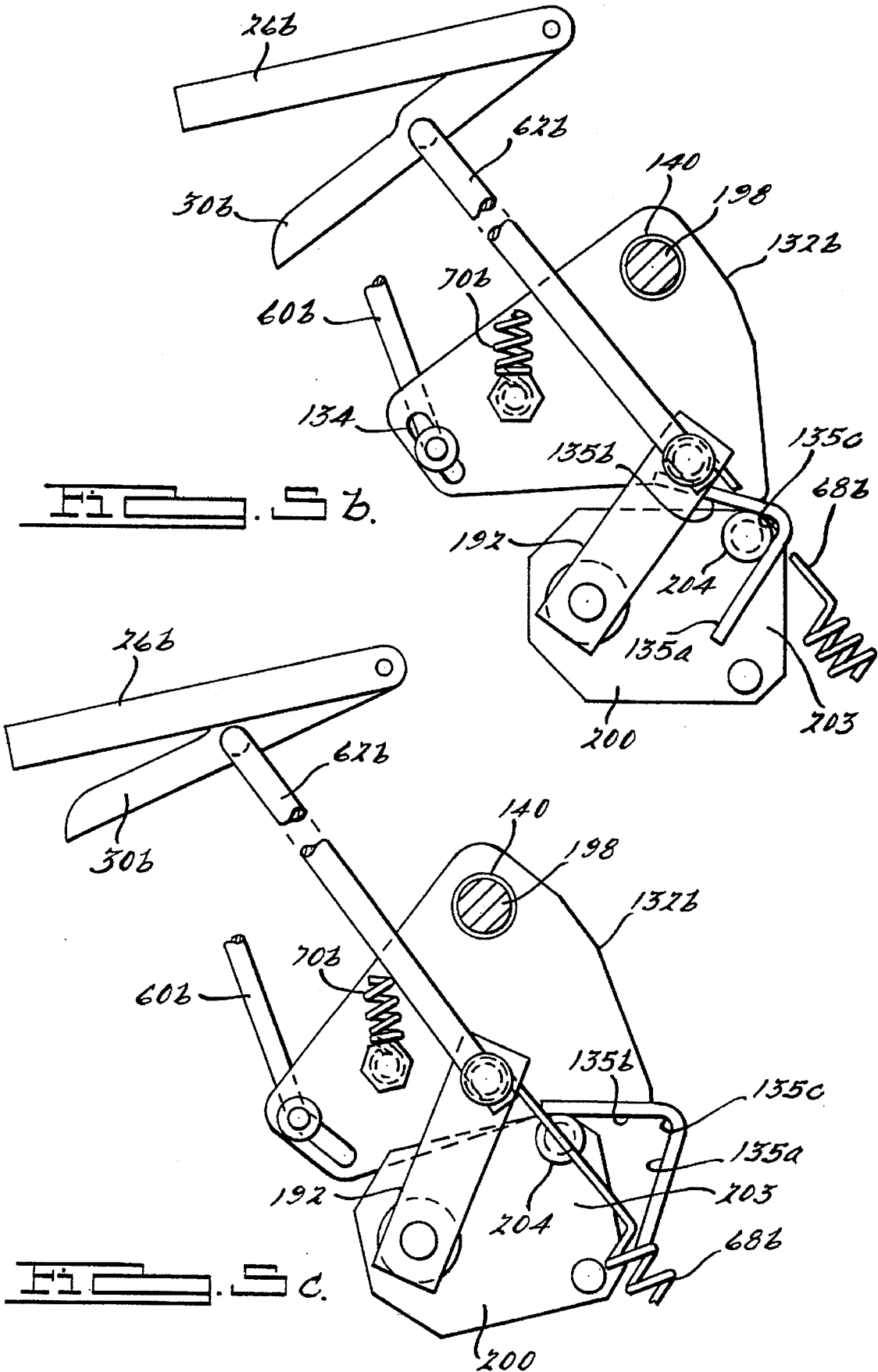

WALK-BEHIND MOWER CONTROLS WITH DUAL FUNCTION CONTROL BRACKET

BACKGROUND OF THE INVENTION

1. Field of the Invention

This invention relates generally to turf care equipment, and more particularly to a system for regulating the operation of a hydrostatic drive of a turf care machine by selectively controlling neutral, reverse and forward modes of the hydrostatic drive with a minimum number of components.

2. Discussion

Conventional commercial walk-behind turf care machines, such as walk-behind lawnmowers and self-propelled vacuum systems, include a number of levers and linkages used to control machine operation. During routine operation, these machines must often be maneuvered around trees, flower beds and other obstacles quickly and with precision. Because these machines typically weigh several hundred pounds, it would be labor intensive, if not impossible, to operate and maneuver the turf care machines in such a manner for extensive periods of time without some type of operator assist device.

Therefore, commercial turf care machines are typically equipped with self-propelling drive mechanisms for driving the wheels of the machines. These drive mechanisms typically include a mechanism for transferring the driving torque from a source of power such as an internal combustion engine to at least two of the machine wheels, thereby turning the machine wheels and assisting the machine operator in both propelling and maneuvering the piece of equipment.

While both hydraulic and mechanical drive mechanisms have been commonly used in the past, hydrostatic drive mechanisms are being implemented in walk-behind turf care machines on an ever increasing basis due to the decrease in price of such systems. Hydrostatic drive mechanisms have long been known to exhibit desirable characteristics such as allowing a machine operator to quickly switch among forward, neutral and reverse modes of operation.

A turf care machine operator manipulates a typical hydrostatic drive mechanism through a plurality of levers located on an operator/turf machine interface such as a pair of handle bars. These operator control systems typically include both traction and speed controls and enhance machine operability and maneuverability. A typical traction control provides the machine operator with selective control among forward, neutral and reverse modes of operation, while a typical speed control provides the operator with a control for regulating the maximum forward speed at which the machine can be operated. Typical speed controls allow reverse operation to occur even when the speed control is set to neutral and do not limit the maximum reverse speed. State-of-the art traction and speed controls are disclosed in the publicly available Ransomes Parts Manual P/N 38422C dated February 1994.

While present hydrostatic drive operator control systems such as those described above exhibit sufficient performance characteristics, such systems require numerous linkages between the components to implement, thus increasing turf care machine cost. It is also desirable to provide more ergonomic arrangements for the operator controls to facilitate ease of operation and provision of operation instructions.

Also, due to increasing international sales and the nature of such equipment, it has become increasingly important to include graphical instruction symbols on the machine in a location readily discernible to the operator.

Therefore, it is an object of the present invention to provide an improved system for regulating/controlling a drive mechanism of a conventional turf care machine.

It is an additional object of the present invention is to provide a system for regulating/controlling the hydrostatic drive system of a turf care machine that allows the operator to limit the maximum reverse speed and helps prevent inadvertent reverse operation when the speed control is in neutral.

It is a further object of the present invention to provide a system for regulating/controlling the hydrostatic drive of a turf care machine that has parts having multiple system functions, thereby minimizing the number of linkages and parts in such a system.

It is also an object of the present invention to provide an ergonomically efficient operator station providing the operator with easy access to machine controls, and with readily visible instruction symbols.

SUMMARY OF THE INVENTION

In accordance with the teachings of the present invention, a control system is provided for regulating operation of a hydrostatic pump implemented in a walk-behind mower. The system of the present invention finds particular utility in heavy commercial walk-behind mowers and aerators, typically weighing several hundred pounds, which must often be manipulated around obstacles during operation.

A system according to one embodiment of the present invention is implemented with operator manipulated speed and traction controls in a walk-behind turf machine for controlling operation of a turf machine hydrostatic pump. The pump includes a rotatable trunion shaft operatively connected to the turf machine speed and traction controls for controlling hydrostatic pump displacement. A rotary sleeve is fitted over the trunion shaft and includes an arm having a roller. A control bracket is operatively connected to the speed control and to the turf machine frame about a pivot point and includes upper and lower bracket contact surfaces for engagement with the roller of the rotary sleeve. Through manipulation of the control bracket, engagement with the roller of the rotary sleeve may be controlled and thereby both the maximum forward and reverse speed of the mower and the urging of the hydrostatic pump into a neutral mode may be controlled. The control bracket of the present invention thus performs two functions thereby eliminating additional components and linkages required in conventional mower controls to perform the same functions.

In accordance with a second embodiment of the present invention, an operator station is provided for a self-propelled walk-behind turf machine. The station includes a main bar rigidly affixed between operator handle bars for increasing structural integrity of the machine. A face plate is mounted on the main bar and extends outwardly therefrom. A pair of rearwardly located brackets are fixedly attached to and extend downwardly from the main bar. Each of these brackets includes an aperture through which a rearwardly located shaft is rotatably attached. A pair of speed control levers is attached to the rearwardly located shaft and extends generally upwardly through a first aperture in the face plate. The shaft transfers motion from the speed control levers to components that are operatively connected to the hydrostatic pumps for control of turf machine's maximum speed.

Additional objects and advantages of the present invention will become apparent from a reading of the following detailed description of the preferred embodiment taken in conjunction with the accompanying drawings and appended claims.

BRIEF DESCRIPTION OF THE DRAWINGS

FIG. 4 is an exploded perspective view of the system control assembly of the present invention; and FIGS. 5a–5c are side elevational schematic views of a traction control lever mechanism of the hydrostatic drive control system of the present invention shown in full forward, neutral and reverse positions, respectively.

DETAILED DESCRIPTION OF THE PREFERRED EMBODIMENT

Figure 1:
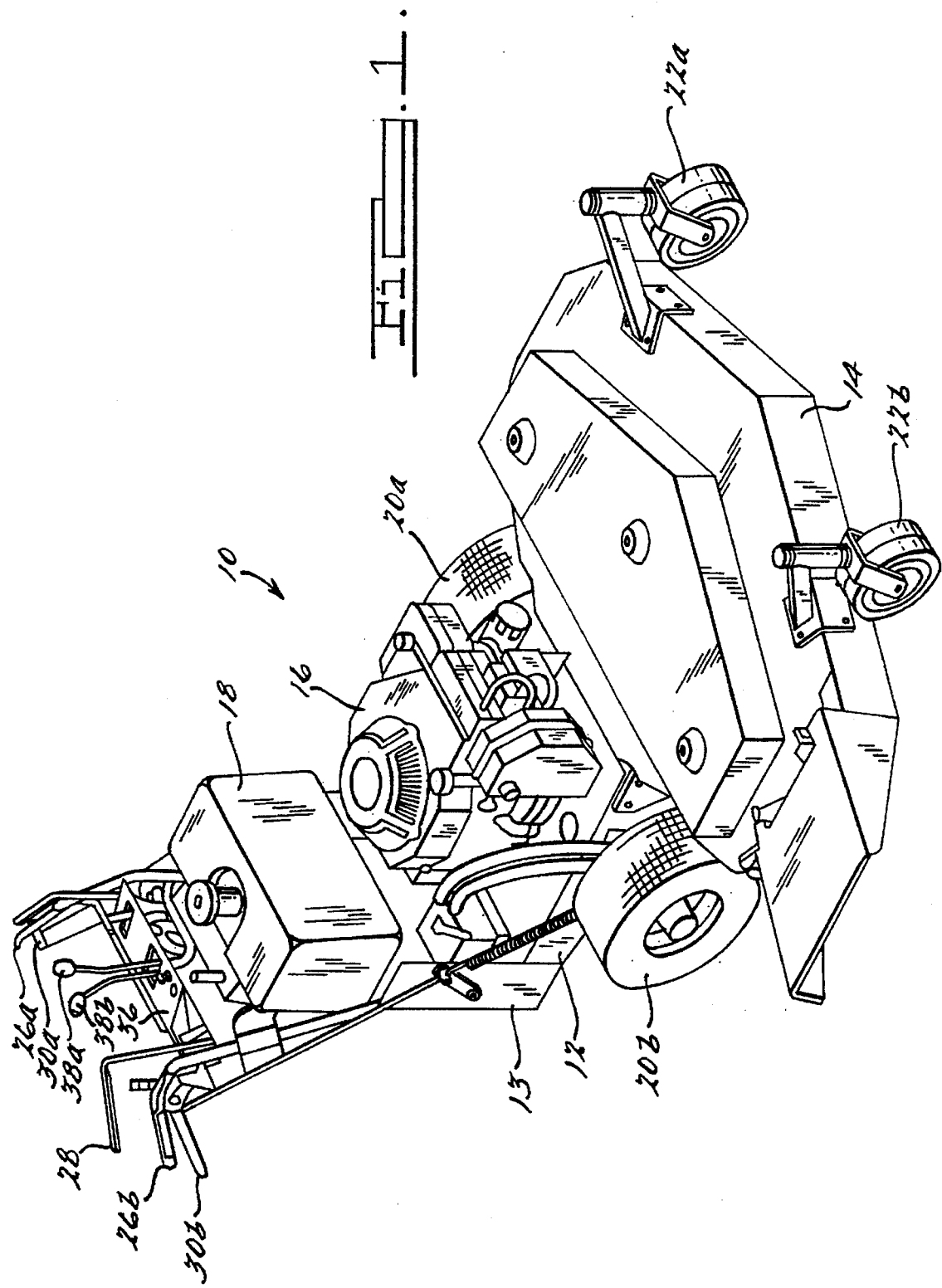
FIG. 1 is a perspective view of a typical walk-behind turf machine incorporating the hydrostatic drive control system of the present invention.

Referring now to the drawings, FIG. 1 shows a typical piece of turf care equipment generally at 10 in which the hydrostatic drive control system of the present invention is implemented. The conventional elements of the turf machine 10 are fully described in publicly available Ransomes Hydro Mid-Size Power Units Parts Manual, P/N-2308093 dated March, 1995. Although the present invention is described as being implemented in association with a hydrostatic drive mechanism in a turf care machine, it should be understood and appreciated that the hydrostatic drive control mechanism of the present invention is also adaptable for use in any piece of machinery in which a hydrostatic drive mechanism is implemented.

Figure 2:
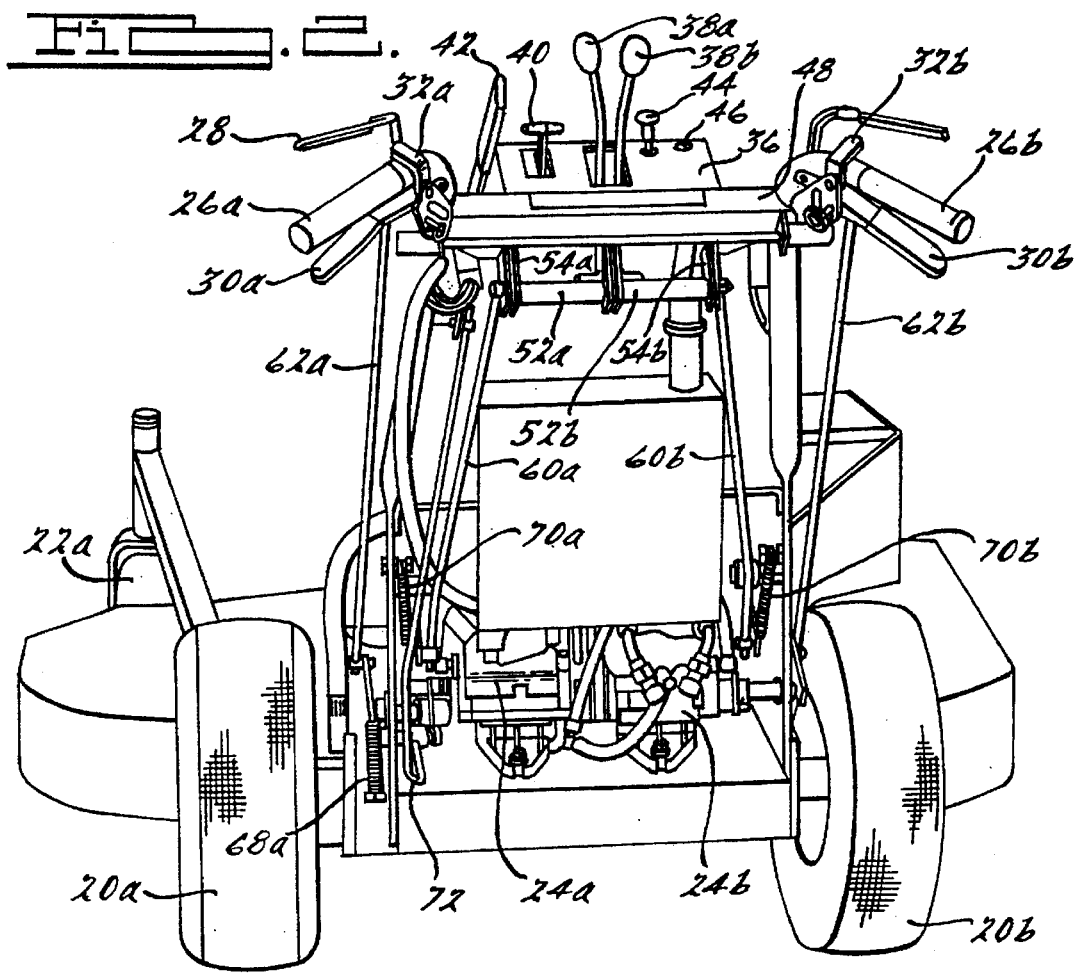
FIG. 2 is a rear elevational view of the walk-behind turf machine shown in FIG. 1.

With reference to both FIGS. 1 and 2, the turf machine 10 includes a base 12 having a support structure 13 rigidly mounted to and extending upwardly from the base 12. A mower deck 14 under which belts and cutting blades (not shown) are located extends from the base. The belts and blades are implemented under the mower deck as shown and described in the publicly available Ransomes Mid-Size Cutter Decks Parts Manual, P/N-2308096. A power source, such as an internal combustion engine shown generally at 16, is mounted to the base and provides power to the various components of the machine in a manner well known in the art. The turf care machine 10 also includes a fuel tank 18 for storing fuel used by the engine 16.

The machine 10 further includes rear wheels 20a, 20b and front wheels 22a, 22b rotatably attached to the base 12 and the mower deck 14, respectively. The rear wheels 20a, 20b are driven by drive mechanisms, such as hydrostatic drives 24a, 24b shown in FIG. 2, in a well-known manner that will be described in more detail below. Attached to the support structure 13 are operator handle bars 26a, 26b. Associated with these handle bars is a deadman control 28 of the type well-known to those skilled in the art to assure that traction and speed controls, described in detail below, are engaged only when an operator is at the machine controls. Also connected to the handle bars 26a, 26b are traction control levers 30a, 30b. The traction control levers allow an operator to selectively switch the hydrostatic drives among forward, neutral and reverse modes of operation in a manner that will be described in more detail below. Also associated with the handle bars 26a, 26b are lockable neutral latch mechanisms 32a, 32b. These neutral latch mechanisms are of the type such as that disclosed in the aforementioned Ransomes Hydro Mid-Size Parts Manual P/N-38422C.

Figure 3:
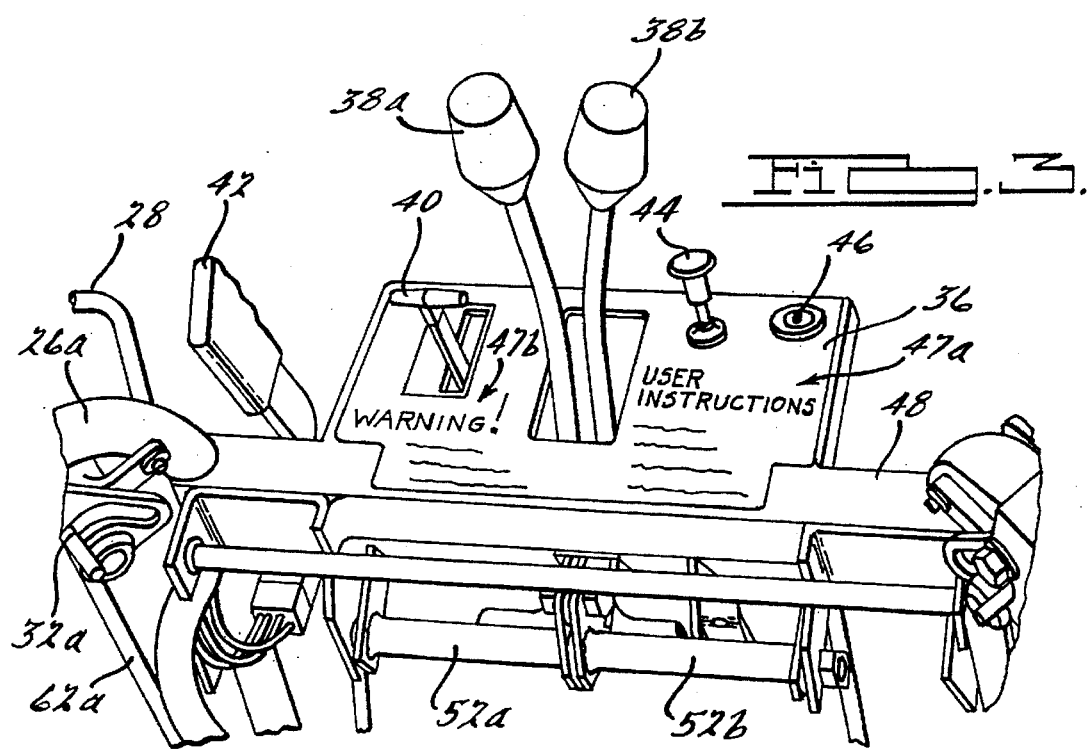
FIG. 3 is a rear elevational view of the driver control panel of the turf machine of FIG. 1 showing in detail the operator controls associated with the present invention.

Referring to FIGS. 2 and 3, the turf machine 10 also includes an operator control panel 36 rigidly affixed between the operator handle bars 26a, 26b. Extending generally upwardly through the control panel 36 are speed control levers 38a, 38b. The speed control levers regulate the maximum forward and reverse speed at which the machine may be run. Also extending upwardly through a second aperture in the control panel is an engine throttle control 40. The throttle control controls the revolutions per minute at which the engine runs. Extending upwardly to the side of the control panel 36 is a blade control lever 42 for controlling the engagement/disengagement of the mower blades. In addition, an engine choke throttle control 44 extends upwardly through the operator control panel 36 through a third aperture and controls an engine choke (not shown). Optionally, the choke control could be integrated with the throttle. An ignition mechanism 46 is also mounted on the operator control panel through a fourth aperture for selectively allowing the engine to be started and shut off. Operator instructions 47a and user warnings 47b are also located on the face of the control panel. The present foregoing construction provides an operator with an ergonomically efficient operator station that features easy access to machine controls, instructions and safety precautions.

FIGS. 2 and 3 show that the operator control panel 36 is mounted to a main bar 48 rigidly affixed between the operator handle bars. The main bar 48 may be affixed between the handle bars 26a, 26b through spot welding or any other suitable technique known to those skilled in the art. Rearwardly located shafts 52a, 52b are integrally associated with the speed control levers 38a, 38b (see FIG. 4) and are rotatably attached to the main bar 48 through brackets 54a, 54b extending downwardly from the main bar 48. Through these connections, the rearwardly located shafts transfer motion from the speed control levers to components operatively connected to the hydrostatic drives 24a, 24b through speed control rods 60a, 60b in a manner set forth in more detail below.

In addition, traction control rods 62a, 62b are shown attached at one end to the traction control levers 30a, 30b and at a second end to the system of the present invention, described in more detail below, for selectively controlling the hydrostatic drives 24a, 24b. In addition, first springs 68a, 68b are also associated with the traction control rods 62a, 62b for biasing the hydrostatic drives 24a, 24b to a forward mode position. Preferably, these springs are Oshkosh Coil Springs Model No. OES-169C-9, or of a similar make, and have a spring rate of 9.6 lb/in. Second springs 70a, 70b are also operatively associated with the traction control mechanism and will be further described below. Additionally, a blade control rod 72 is associated with the blade control lever 42 for engaging/disengaging the blade drive mechanism.

Referring now in detail to FIG. 4, an exploded view showing interconnection of the components of the present invention is shown. It should be understood that the following description of the structure of the control mechanism of the present invention will be with reference to the right hand controls (i.e., speed control lever 38b, speed control rod 60b) as shown in FIG. 3 unless otherwise indicated. Operation of the left hand controls and associated system components should be understood to be identical to that of the right hand components.

The neutral latch mechanism 32, shown in component form, is of the type discussed previously and is well known to those skilled in the art. The neutral latch mechanism 32 is pivotably attached to the mower handle bars 26 through a double ended stud 80 as shown. The double ended stud in turn is rotatably positioned through an aperture in the handle bars 26 and is held in place by a lock nut 82. The mechanism is operatively connected to the traction control rod 62b for selectively controlling forward, reverse and neutral modes of the machine in the manner well known to those skilled in the art.

Reference will next be made to the assembly of the speed control levers 38a, 38b and the associated rearward shafts 52a, 52b to the mower. The shafts 52a, 52b are connected to the main bar 48 between the handle bars 26a, 26b by a rod 84. The rod 84 is inserted through the bracket aperture 56a. A friction washer 86 is then placed over the rod. The rod is then inserted through the speed control shafts 52a and 52b and through the bracket aperture 56b such that a threaded end of the rod 84 extends through the aperture 56b. A friction washer 92 is placed between the shafts 52a, 52b to provide a gap between the shafts so that the shafts can rotate independently of one another. The rod, and thus the control levers 38a, 38b and the associated shafts 52a, 52b, are rotatably positioned on the rod 84 by a friction washer 94 and a lock nut 96 threadably secured to the threaded end of the rod 84 projecting through the bracket 54b.

The shafts 52a, 52b are further secured to one another by a large threaded screw 100. A friction washer 102 and a spring 104 are fitted over the screw 100. The screw 100 is then inserted through second apertures 106a and 106b (not shown) located on inner mounting faces of the shafts 52a, 52b. A friction washer 108 is also placed over the screw 100 between the mounting faces of the shafts 52a, 52b. The screw 100 is held in place by a hexagonal lock nut 112, which is threadably secured to the threaded end of the screw 100 projecting from the aperture 106b (not shown).

The interconnection of shafts 52a, 52b by the rod 84, the screw 100 and aperture 113 prevents the shafts from rotating relative to one another by more than a predetermined set distance. This feature helps to regulate how far one lever may be moved relative to the other lever so as to control the maximum rate of rotation of the machine should only one of the levers 38a, 38b be moved and prevents sudden unexpected sharp turns should only one lever be bumped or otherwise inadvertently moved. Alternatively, the shaft 52b may be designed without the aperture 113. As the speed control lever 38b may be moved independently of the speed control lever 38a, the left and right rear wheels 20a, 20b may be intentionally set to run at slightly different speeds. This in turn enables the operator to more effectively handle the mower on sloped terrain or when the operator mows in a non-linear pattern. This arrangement also allows the operator to compensate for differences in hydraulic drive efficiency or variations in the linkages from one side to the other, enabling the operator to drive the machine in a straight line and/or to reduce the number of required manual course corrections.

The speed control rods 60a (not shown) and 60b are connected to the shafts 52a and 52b through apertures 116a and 116b on the outer mounting faces of the brackets. The inwardly curved upper section of the speed control rod 60b is inserted into the aperture 116b and secured in this position by a hairpin cotter 118. The lower threaded end of the speed control rod 60b is connected to a swivel 130. Swivel 130 in turn is then slidably connected to a pump displacement control bracket 132, which has an associated control bracket flange 133, and elongated slot 134. The control bracket 132 performs two functions and is a key component in the preferred embodiment of the present invention. The control bracket flange 133 includes a V-shaped roller contact portion defined by upper and lower bracket contact surfaces 135a, 135b (see FIGS. 5a–5c). The swivel 130 is slidably maintained within the slot 134 by a washer 136 in combination with a hairpin cotter 138.

The dual function pump displacement control bracket 132 is connected to the support structure 13 about an aperture at a pivot point on the control bracket, shown at 140. A screw 142, or other similar retaining means, pivotably maintains the control bracket in position with respect to the support structure 13. A lock washer 144 and washer 146 are located between the screw and the outer wall of the support structure to support the screw head over the aperture in the support structure wall. On the inner side of the support structure wall, the screw 142 is inserted into an eccentric shaft 148, which in turn is inserted into the aperture 140 of the control bracket 132. The control bracket is pivotably maintained on the eccentric shaft by a plastic bearing 150 and snap ring 152 in engagement with the eccentric shaft 148. The eccentric shaft has a shoulder which is received into the aperture of the support structure wall and permits the neutral position of the control bracket 132 to be adjusted to a desired position by rotation of the eccentric shaft through loosening and tightening of the screw 142.

The pump displacement control bracket 132 of the present invention is also connected to the spring 70b, which is preferably an Oshkosh Coil Spring Model OES-159B-5 having a spring rate of 6.1 lb/in. The spring is connected at its lower end to the control bracket 132 by a hexagonal bolt 162, which is inserted through a lower loop end of the spring. A nut 164 is inserted over the bolt to provide a shoulder before the bolt is inserted through an aperture 165 located in the control bracket 132 between the slot 134 and the pivot aperture 140. The bolt 162 is then securely fixed to the control bracket by a second nut 166. The spring 70b is also secured to the wall of the support structure 13 by a hexagonal bolt 170. The bolt 170 extends through an upper loop end of the spring 70, through a hexagonal nut 172 on the inner side of the wall and through an aperture in the wall of the support structure 13. The bolt 170 is securely fixed to the wall of the support structure by a hexagonal nut 174.

Still referring to FIG. 4, the interconnection of the traction lever 30b, located on the right hand handle bar of the mower, to the remainder of the traction control system of the present invention will be described, with it being understood that interconnection of the left hand traction control 30a is identical. The pivot end of the control lever is formed to fit around the handle bar 26b so that two apertures located on the pivot end may be concentrically aligned with a bore extending through the handle bar. A pin clevis 182 is then inserted through the apertures and the bore to hold the lever 30b in pivotal position on the handle bar. The pin clevis 182 is held in position by a push nut 184.

The control lever 30b is also connected to the traction control rod 62b. An upper inwardly curved end of the control rod is placed through an aperture in the traction lever and is held in this position by a hairpin cotter 186 in combination with a washer 188.

The traction control rod 62b is connected at its lower threaded end to the traction control components comprising a part of the present invention. The lower threaded portion of the rod 62b is threadably connected to a swivel 190. The swivel 190 in turn is rotatably connected to a control arm 192 that includes a control arm shaft 193. A small cylindrical flange of the swivel 190 projects through an aperture in the control arm. A hairpin cotter 194 is inserted through a small bore in the flange to rotatably secure the swivel to the control arm 192. A self-aligned bearing 196 is inserted over the shaft of the control arm and is secured to the wall of the support structure by two screws 197. The shaft 193 extends through the self-aligned bearing 196, through an aperture in the support structure wall and into rotatable contact with a pivoting lever structure 199, including a rotary sleeve 200, and is secured within the rotary sleeve 200 by a roll pin 202. The rotary sleeve 200 in turn is secured to the trunion shaft 25b of pump 24b by set screw 212.

As shown in FIG. 4, the pivoting lever structure 199 also includes an arm 203 extending from the rotary sleeve 200 and a bearing roller 204 rotatably engaged with the arm 203. A hex bolt 206 is inserted through an aperture in the bearing roller 204 and is fitted through an aperture 205 in the arm 203. Washers 210 are fitted over the hex bolt and are located between the bearing roller and the arm to space out the bearing roller to allow rotation of the bearing roller and align it with flange 133. A hexagonal nut 214 secures the hex bolt 206 to the arm. In the assembled system, the bearing roller 204 abuts the V-shaped contact portion of the control bracket defined by the surfaces 135a, 135b of the pump displacement control bracket 132 as set forth in detail in the description of the operation of the system below.

The traction control lever is biased to a forward mode position by the spring 68b, which is connected at its upper end to the control arm 192 by being hooked over the flange of the swivel 190 projecting through the aperture in control arm 192. The hairpin cotter 194 secures the spring 68b at its upper end. The spring is connected at its lower end to the mower base 12 through a hexagonal bolt 214. The bolt 214 is connected to the base by hexagonal nuts 216 and 218.

The roll pin 202 has an interference fit with the shaft of the control arm 192 and a loose fit with the sleeve 200. This feature provides a neutral range wherein the bearing roller 204 is held in the neutral position by surfaces 135a, 135b of control bracket 132, such that the traction lever 30 and the rod 62 may be manipulated to a limited extent without moving the hydrostatic drive out of the neutral position. Specifically, this neutral range allows the neutral latch mechanism 32 to be moved in and out of the latched position without affecting the neutral setting of the hydrostatic drive. The neutral range also allows the traction control rod 62 to have a coarse adjustment without affecting the neutral setting. If the control arm 192 and the sleeve 200 were solidly pinned together, any movement of the traction lever 30 would cause the trunion shaft 25 to move out of neutral and cause the machine to creep. Likewise, if the rod 62 was of an imperfect length, the spring 68 would cause the hydrostatic drive pump to stroke forwardly if the rod 62 were too long or the hydrostatic drive would stroke rearwardly if the rod 62 were too short.

From the foregoing description, it should be understood that the control bracket 132, through its connection to the speed control lever 38b via the bearing roller 204, controls the maximum speed setting of the hydrostatic drive pump. Also, through the cooperation of the spring 70b, the control bracket also urges the trunion shaft of the hydrostatic drive into a neutral mode of operation when its respective traction control lever 30b is moved to an intermediate position. The dual functions performed by the control bracket 132 thus helps reduce the number of components and linkages that are typically found on conventional traction control mechanisms, and thus helps lower system cost and assembly requirements.

Referring now to FIGS. 5a–5c, operation of the traction control lever 30b will now be further described to help more clearly illustrate the dual functions of the control bracket 132. With reference to FIG. 5a, operation of the mower with the traction control lever in a forward mode is shown. The traction control lever 30b is raised slightly to facilitate rotating the neutral latch mechanism 32b to the drive position. Releasing the traction control lever 30b allows the spring 68 to pull the control arm 192 forward. The bias of the spring 68 also rotates the rotatable sleeve 200 forward. The sleeve 200, which is fixed securely to the trunion shaft 25b, thus rotates the trunion shaft. The bearing roller 204 contacts the bracket contact surface 135a and, due to the force of the spring 68 overcoming the force of the spring 70, rotates the pump displacement control bracket 132 until the swivel 130 reaches the top of the slot 134, thereby stopping any further rotation and limiting the speed of the mowing machine to that selected through the speed control lever 38. In other words, the wheel speed is controlled by limiting the output flow of the pump associated with the hydrostatic drive motor.

FIG. 5b shows the traction control lever 30b in a neutral mode. The traction control lever is placed into this neutral mode by movement of the lever 30b up toward the handle bar 26b. This motion pulls the traction control rod 62b upwardly, as long as the biasing force of the spring 68b, which normally biases the traction control rod 62b downwardly to a forward mode position, is overcome. The spring 70b, which has a spring force less than that of the spring 68b, subsequently urges the control bracket 132b to follow the bearing roller 204 and the swivel 130 to slide down the slot 134. The bracket, through contact with the roller, urges the rotary shaft, and thus the trunion shaft 25b, into its neutral mode position. In this neutral mode position, the bearing roller 204 abuts the bracket control surface adjacent the intersecting point 135c of the bracket contact surfaces 135a and 135b and is thus held in this neutral position by the urging of the spring 70. In addition, the control arm 192 is rotated in a counterclockwise position, which also rotates the rotary sleeve 200 in a counterclockwise position. This counterclockwise rotation of the control arm rotates the trunion shaft 25b to its neutral mode position, causing the hydrostatic drive to cease driving the rear wheel 20b. Because the roll pin 202 is in loose engagement with the rotary sleeve 200 and in an interference fit with the control arm shaft 193, the control system according to the present invention affords the mower operator with a neutral mode zone rather than a particular position, in the traction control lever. This neutral mode zone allows the traction levers 30 to be raised to rotate the neutral latch mechanisms 32a, 32b between their neutral and drive positions without having the machine back up. It also eliminates the need for precise adjustment of traction control rods 62a, 62b to obtain the neutral positions of their respective pumps. This is especially useful when the traction lever 30 is moved to a neutral position before speed control levers 38 are moved to a neutral position.

Another feature of the control system of the present invention is that the movement of the speed control levers to their respective rearwardmost positions relative to the operator control panel 36 will also place the mower in a neutral mode. When each speed control lever 38 is in this neutral mode position, the swivel 130 is held at the top of the slot 134 in the pump displacement control bracket 132 when properly adjusted. This in turn prevents the pump displacement control bracket 132 from rotating forward, thus preventing either forward flow or reverse flow from the hydrostatic drive pump. Thus, when the speed control is set in neutral, an operator cannot inadvertently operate the machine in reverse.

FIG. 5c shows the traction control lever 30b moved into a reverse mode by the operator. In actual use, the operator selects a maximum mower speed through forward movement of the speed control 38b, thereby moving the speed control rods 60 downwardly. As the speed control rods 60 are moved downwardly, the swivel 130 on the lower end of the rod 60 is received in the slot 134 of the pump displacement control bracket 132, thus limiting the rotation of the bracket. The control lever 30b is placed in the reverse mode through movement of the lever by the operator upwardly past the neutral position. Contact with the handle bar 26b pulls the traction control rod into its upwardmost position. As the operator moves the traction levers 30 past the neutral mode position, the bias of both springs 68 and 70 is overcome. This movement thus raises the traction control rod 62 and rotates the control arm 192 rearwardly together with the sleeve 200. The roller 204 is held against the upper end of contact bracket surface 135a by the spring 70 and rotates the bracket forward until the swivel 130 hits the top of the slot 134, thus limiting the maximum reverse flow of the hydrostatic drive pump and consequently the reverse speed of the machine to that determined by the setting of the speed control lever 38b.

It should be noted that the machine can be steered by varying the displacement of the pump driving one side or the other of the machine by slowing or speeding up the respective drive wheel. It should be further noted that separate speed control levers 38a, 38b for each side allows adjustment to correct for differences in linkage or hydraulic efficiency to make the machine track straight instead of drifting to one side.

It should thus be appreciated that each of the pump displacement control brackets of the present invention 132a, 132b controls both maximum forward and reverse speeds of its respective mower wheel and also controls the selective placement of the mower into a forward, neutral or reverse mode. The dual functions controlled by the brackets 132a, 132b thus helps reduce the number of mower components and linkages, which thus helps reduce mower cost and maintenance.

It should also be appreciated that the operator control panel 36 of the present invention as described and shown provides a mower operator with an ergonomically efficient control panel with readily accessible mower controls, and readily visible mower operating instructions and/or mower safety instructions.

While the above description discusses a preferred embodiment of the present invention, it will be understood that the description is exemplary in nature and is not intended to limit the scope of the invention. For example, the invention, while disclosed for use with a commercial walk-behind lawnmower, may also be used with other commercial walk-behind equipment, such as a turf vac. The present invention will therefore be understood as susceptible to modification, alteration, and variation by those skilled in the art without deviating from the fair scope of the invention as defined in the following claims.

I claim:

1. In a walk-behind turf machine including a base mounted on a plurality of wheels, a support structure affixed to and extending from said base, a power source operatively mounted to said base, at least one hydrostatic pump operatively connected to said base for driving at least one of said wheels, and a turf machine-operator interface extending from said support structure, a mechanical control system for regulating operation of said hydrostatic pump, comprising:

a rotatable trunion shaft extending from said hydrostatic pump for controlling maximum hydrostatic pump displacement and direction;

speed and traction controls mounted on said operator interface and in mechanical communication with said trunion shaft;

a pivoting lever structure including a rotary sleeve fitted over said trunion shaft, said lever structure including an arm extending transversely from said rotary sleeve and having a roller attached thereto; and a control bracket operatively connected to said turf machine speed and traction controls and including a bracket contact surface for engaging said roller of said rotary sleeve, said control bracket being arranged for selectively controlling maximum allowed forward and reverse speeds of at least one of said turf machine wheels by controlling rotation of said trunion shaft through rotatable engagement of said control bracket with said roller of said rotary sleeve, said control bracket further selectively rotating said trunion shaft to a neutral mode of operation in response to movement of said traction and speed controls.

2. The system of claim 1, wherein said traction control comprises a pivotable lever with forward, neutral and reverse positions that selectively and generally correspondingly rotates said trunion shaft, thereby controlling forward, neutral and reverse modes of operation of said turf machine.

3. The system of claim 1, wherein said speed control controls the rotational position of said control bracket, said bracket selectively controlling maximum turf machine speed by limiting directional rotation of said trunion shaft.

4. The system of claim 1, further comprising a first spring for biasing said traction control to a forward mode position.

5. The system of claim 4, wherein said first spring is operatively connected between said traction control and said base of said turf machine.

6. The system of claim 5, wherein said traction control comprises:

a releasable lever for controlling forward, neutral and reverse modes of said turf machine through rotation of said control bracket, said hydrostatic pump being placed in a forward mode when said releasable lever is in a released position, said hydrostatic pump being placed in a neutral mode when said releasable lever is in a partially retracted position, said hydrostatic pump being placed in a reverse mode when said releasable lever is in a fully retracted position, said releasable lever overcoming a forward bias of said first spring when said releasable lever is in said partially retracted position.

7. The system of claim 6, further comprising a second spring for urging said control bracket into a neutral mode position when the bias of said first spring is overcome by movement of said traction control from said released position to said partially retracted position.

8. The system of claim 1, further comprising a primary bar fixedly attached to and extending between handles of said turf machine;

a pair of brackets extending from said primary bar; and a shaft rotatably connected between said brackets to which said speed control is connected, said shaft transferring movement of said speed control to said control bracket for governing maximum rotational movement of said trunion shaft.

9. The system of claim 1, wherein said rotary sleeve is connected by retaining means to a control arm shaft.

10. The system of claim 9, wherein said retaining means is fitted in an interference fit through a bore in said control arm shaft and in loose engagement with a bore in said rotary sleeve, said loose engagement with said rotary sleeve allowing said traction control to have a neutral mode zone.

11. The system of claim 10, wherein said control bracket controls selective placement of said turf machine in said neutral mode zone.

12. A mechanical control system for selectively operating a variable speed, reversible hydrostatic drive of a self-propelled power-driven turf care machine, the hydrostatic drive including a rotatable trunion, the control system comprising:

a rotatable trunion shaft extending from the hydrostatic drive and having a range of forward positions, a neutral position, and a range of reverse positions;

an operator manipulated traction control, having a range of forward positions, a neutral position and a range of reverse positions, the traction control operatively connected to and arranged to selectively rotate the trunion shaft and hold the trunion shaft in any one of its forward, neutral and reverse positions;

a pivoting lever structure including a rotary sleeve fitted over and generally rotating with the trunion shaft, the lever structure including an arm extending rigidly and transversely from the rotary sleeve and a roller rotatably attached to the arm;

a dual function control bracket pivotally mounted to the turf machine and operatively connected to the traction control, the control bracket including a V-shaped roller contact portion having a plurality of roller contact surfaces for selectively limiting the rotational movement of the trunion shaft by limiting movement of the roller;

an operator manipulated speed control for setting a desired maximum speed of the hydrostatic drive, the speed control being operatively arranged with and influencing the pivotable position of the control bracket to limit the relative rotation of the trunion shaft through positive contact between the roller and at least one of the roller-contact surfaces of the V-shaped contact portion of the dual function control bracket; and means for urging the V-shaped contact portion of the control bracket into the roller to thereby force the trunion shaft into a neutral mode, when the traction control is moved from one of its forward positions into its neutral position.

13. A control system as in claim 12, in which the hydrostatic drive includes a variable displacement reversible hydraulic pump, and wherein the control system further comprises:

an eccentric shaft for rotatably connecting the control bracket to the turf care machine, the eccentric shaft being arranged to enable a fine adjustment of the position of the control bracket to achieve a true neutral position for the trunion shaft when the traction control is in its neutral position.

14. In a self-propelled walk-behind turf care machine, said turf care machine including a base including a rear portion having a plurality of hydrostatic drives for powering driven wheels mounted to the rear portion of the base, a handle bar support structure mounted near the rear portion of the base and extending from said base, a pair of operator handle bars extending upwardly from said support structure, and a plurality of operator controls associated with said operator handle bars for controlling operation of said turf machine, an operator station comprising:

a generally horizontally arranged main bar structure rigidly affixed between said operator handle bars for increasing structural integrity of said turf machine;

a face plate mounted on said main bar structure and extending outwardly therefrom, the face plate having at least a first opening therethrough;

a pair of rearwardly located brackets fixedly attached to and extending downwardly from said main bar, each of said brackets including an aperture;

a generally horizontally arranged retaining rod between the handle bars and supported by the apertures in the brackets; and a pair of rearwardly located shafts rotatably supported by the retaining rod and positioned between the handle bars; and at least two speed control levers, each lever being integrally attached to one of said rearwardly located shafts and extending generally upwardly through the first opening in said face plate, the shafts being arranged for transferring motion from said speed control levers to components operatively connected to hydrostatic drives of said turf machine.

15. The operator station of claim 14 for a self-propelled walk-behind turf machine, in which the machine further includes an engine having a throttle, wherein the operator station has a second aperture in the face plate and the operator station further comprises:

a throttle control lever operatively connected to the throttle of the engine, the throttle control lever extending generally upwardly through a second aperture in the face plate.

16. The operator station of claim 14, for a self-propelled walk-behind turf machine, in which the engine of the turf care machine further includes a choke, and wherein the operator station has a third aperture in the face plate and the operator station further comprises:

a choke control operatively connected to a choke of the engine and extending generally upwardly through a third aperture in the face plate.

17. The operator station of claim 14, for a self-propelled walk-behind turf machine, in which the engine of the turf care machine further includes an ignition mechanism, and wherein the operator station has a fourth aperture in the face plate and the operator station further comprises:

an ignition operating device operatively connected to the ignition mechanism of the engine, the operating device mounted within the fourth aperture in the face plate and being arranged for selectively starting and stopping the engine.

18. The operator station of claim 14, further comprising means for displaying operator instructions and warnings on said face plate.

19. The operator station of claim 14, further comprising means for limiting relative rotation of said shafts between one another.

* * * * *